United States Patent Office 3,387,946
Patented June 11, 1968

3,387,946
PROCESS FOR PREPARING IMINO-
BIS(SULFURYL HALIDE)
Rolf Appel, Bonn, Germany, assignor to Olin Mathieson
Chemical Corporation, a corporation of Virginia
No Drawing. Filed Jan. 28, 1964, Ser. No. 340,788
Claims priority, application Germany, Oct. 29, 1963,
O 9,750
4 Claims. (Cl. 23—357)

ABSTRACT OF THE DISCLOSURE

Iminobis(sulfuryl halides), known compounds of known utility, are prepared by reacting sulfuryl diisocyanate with a halosulfonic acid.

This invention relates to a new process for the preparation of iminobis(sulfuryl halides). The fluoride has previously been prepared as described by Appel et al., Chem. Ber. 95, 246 (1962) from fluorosulfonic acid and urea according to the equation:

$$H_2NCONH_2 + 3FSO_3H \rightarrow HN(SO_2F)_2 + NH_4HSO_4 + HF + CO_2$$

The chloride has similarly been prepared as described by Appel et al., Chem. Ber. 95, 626 (1962).

According to the present invention, the iminobis(sulfuryl halide) is prepared by the reaction of sulfuryl diisocyanate with halosulfonic acid in a molar ratio of substantialy 1:2.

The iminobis(sulfuryl halide) has the formula $$HN(SO_2X)_2$$

The proportion of halosulfonic acid may vary up to 10% from the ratio of 1:2 but at least the stoichiometric proportion of halosulfonic acid is preferred.

The process of the invention is carried out preferably without solvent or diluent and at a temperature of 100° to 200° C. The reaction is complete as soon as carbon dioxide evolution ceases. The residual iminobis (sulfuryl halide) is used directly or is distilled under reduced pressure from the reaction mixture.

The fluorosulfonic acid when used in this process can be prepared by the process of Meyer, Z. anorg. allgem. Chem. 206, 25 (1932) and the sulfuryl diisocyanate according to German Patent 940,351 from cyanogen bromide and sulfur trioxide.

The iminobis(sulfuryl fluoride) is a valuable intermediate in the preparation of inorganic and organic compounds useful as pesticides, wood preservatives and pharmaceuticals.

EXAMPLE I

A mixture of 14.8 g. (0.1 mole) of sulfuryl diisocyanate and 20 g. (0.2 mole) of fluorosulfonic acid was heated under reflux for 48 hours in an oil bath at 160° to 165° C. Then the carbon dioxide evolution had ceased and the resulting iminobis(sulfuryl fluoride) was distilled from the reaction mixture at 1 mm. The distillate was carefully fractionated. Yield: 12.6 g. (70% of theory). Boiling point at 760 mm. was 170° C. Melting point 17° C.

Analysis.—$HNO_4S_2F_2$ (181.1). Calc.: 7.7 N; 35.2 S; 21.1 F. Found: 7.8 N; 35.4 S; 21.3 F.

EXAMPLE II

A mixture of 14.8 g. (0.1 mole) of sulfuryl diisocyanate and 23.3 g. (0.2 mole) of chlorosulfonic acid in a 100 ml. flask was heated under reflux in an oil bath at 150–160° C. The reaction was complete when a gas bubbler filled with concentrated sulfuric acid and attached to the reflux condenser showed no more $CO_2$ evolution. By vacuum distillation, 17 g. of iminobis(sulfuryl chloride) boiling at 75–78° C. at 0.1 to 1 mm. pressure was obtained. It crystallized in the receiver an melted at 37° C. Yield: 80% of theory.

What is claimed is:
1. The method of preparing a compound of the formula $HN(SO_2X)_2$ wherein X is selected from the group consisting of chlorine and fluorine by heating a mixture of sulfuryl diisocyanate and halosulfonic acid, said halosulfonic acid selected from the group consisting of chlorosulfonic acid and fluorosulfonic acid, in molar proportions of substantially 1:2 at 100° to 200° C., and removing carbon dioxide from said mixture.
2. The method of preparing iminobis(sulfuryl fluoride) by heating a mixture of sulfuryl diisocyanate and fluorosulfonic acid in molar proportions of substantially 1:2 at 100° to 200° C., and removing carbon dioxide from said mixture.
3. The method of preparing iminobis(sulfuryl chloride) by heating a mixture of sulfuryl diisocyanate and chlorosulfonic acid in molar proportions of 1:2 to 1:2.2 at 100° to 200° C., and removing carbon dioxide from said mixture.
4. The method as claimed in claim 1 in which the compound of the formula $HN(SO_2X)_2$ is distilled from the resulting reaction mixture.

References Cited

FOREIGN PATENTS 940,351    3/1956    Germany.
1,152,093  7/1963    Germany.

OTHER REFERENCES

Appel et al.: "Berichte," vol. 95, pp. 1753–1755 (July 1962).

Appel et al.: "Berichte," vol. 97, pp. 849–851 (March 1964).

MILTON WEISSMAN, *Primary Examiner.*